United States Patent
Le et al.

(10) Patent No.: US 7,464,458 B2
(45) Date of Patent: Dec. 16, 2008

(54) METHOD FOR MANUFACTURING A SELF-ALIGNED, NOTCHED TRAILING SHIELD FOR PERPENDICULAR RECORDING

(75) Inventors: Quang Le, San Jose, CA (US); Aron Pentek, San Jose, CA (US)

(73) Assignee: Hitachi Global Storage Technologies Netherlands B.V., Amsterdam (NL)

( * ) Notice: Subject to any disclaimer, the term of this patent is extended or adjusted under 35 U.S.C. 154(b) by 0 days.

(21) Appl. No.: 11/830,552

(22) Filed: Jul. 30, 2007

(65) Prior Publication Data

US 2007/0268627 A1 Nov. 22, 2007

Related U.S. Application Data

(62) Division of application No. 10/789,563, filed on Feb. 27, 2004, now Pat. No. 7,265,941.

(51) Int. Cl.
*G11B 5/127* (2006.01)
*H04R 31/00* (2006.01)

(52) U.S. Cl. ............. 29/603.16; 29/603.11; 29/603.13; 29/603.18; 216/62; 216/66; 216/67; 360/121; 360/122; 360/317; 451/5; 451/41

(58) Field of Classification Search ............. 29/603.11, 29/603.13–603.16, 603.18; 216/62, 66, 67; 360/121, 122, 126, 317; 427/127, 128; 451/5, 451/41

See application file for complete search history.

(56) References Cited

U.S. PATENT DOCUMENTS

| 6,393,692 | B1 * | 5/2002 | Ju et al. | ............... | 29/603.14 |
| 6,687,096 | B2 * | 2/2004 | Sasaki et al. | ............ | 360/317 |

\* cited by examiner

*Primary Examiner*—Paul D Kim
(74) *Attorney, Agent, or Firm*—Zilka-Kotab, PC

(57) ABSTRACT

A perpendicular magnetic write head having a notched, self aligned trailing shield for canting a magnetic field emitted therefrom.

6 Claims, 11 Drawing Sheets

METHOD FOR MANUFACTURING A SELF-ALIGNED, NOTCHED TRAILING SHIELD FOR PERPENDICULAR RECORDING

RELATED APPLICATIONS

The present Application is a Divisional Application of commonly assigned patent application Ser. No. 10/789,563 entitled SELF-ALIGNED, NOTCHED TRAILING SHIELD FOR PERPENDICULAR RECORDING, filed Feb. 27, 2004, now U.S. Pat. No. 7,265,941.

FIELD OF THE INVENTION

The present invention relates to perpendicular magnetic recording, and more particularly to the manufacture of a magnetic write head for perpendicular recording having a self aligned trailing shield.

BACKGROUND OF THE INVENTION

At the heart of a computer is a magnetic disk drive that includes a magnetic disk, a slider where a magnetic head assembly including write and read heads is mounted, a suspension arm, and an actuator arm. When the magnetic disk rotates, air adjacent to the disk surface moves with it. This allows the slider to fly on an extremely thin cushion of air, generally referred to as an air bearing. When the slider flies on the air bearing, the actuator arm swings the suspension arm to place the magnetic head assembly over selected circular tracks on the rotating magnetic disk, where signal fields are written and read by the write and read heads, respectively. The write and read heads are connected to processing circuitry that operates according to a computer program to implement write and read functions.

Typically magnetic disk drives have been longitudinal magnetic recording systems, wherein magnetic data is recorded as magnetic transitions formed longitudinally on a disk surface. The surface of the disk is magnetized in a direction along a track of data and then switched to the opposite direction, both directions being parallel with the surface of the disk and parallel with the direction of the data track. Data density requirements are fast approaching the paramagnetic limit wherein the bits of data become so small that they will not remain magnetized.

One means for overcoming this paramagnetic limit has been to introduce perpendicular recording. In a perpendicular recording system, bits of data are recorded magnetically perpendicular to the plane of the surface of the disk. The magnetic disk may have a relatively high coercivity material at its surface and a relatively low coercivity material just beneath the surface. A write pole having a small cross section and high flux emits a relatively strong, concentrated magnetic field perpendicular to the surface of the disk. This magnetic field emitted from the write pole is sufficiently strong to overcome the high coercivity of the surface material and magnetize it in a direction perpendicular to its surface. This flux then flows through the relatively soft underlayer and returns to the surface of the disk at a location adjacent a return pole of the write element. The return pole of the write element has a cross section that is much larger than that of the write pole so that the flux through the disk at the location of the return pole (as well as the resulting magnetic field between the disk and return pole) is sufficiently spread out to render the flux too week to overcome the coercivity of the disk surface material. In this way, the magnetization imparted by the write pole is not erased by the return pole.

It will be appreciated by those skilled in the art that the high coercivity of the disk surface material can make it difficult to magnetize. It has been found that angling the magnetic field slightly can improve transition sharpness and achieve better media signal to noise ratio. A proposal to achieve this has been to place a trailing shield near the write gap and magnetically connected with the return pole. The shield would in effect attract field emitted from the write pole, thereby angling it slightly. A challenge encountered with this approach is that some field is lost to the shield, and increasing write field to compensate for this can lead to adjacent track interference due to stay fields. Fields fringing out the sides of the write pole, to the wider trailing shield only exacerbate this problem. In addition, shadowing effects from the shield create manufacturing problems during the ion milling operation that is generally used to construct desired flared write pole.

Therefore, there remains a need for a mechanism for canting the magnetic field of a perpendicular write pole, while minimizing field loss and stray field writing. In addition such a mechanism for canting the field must be manufacturable, not creating problems for other critical manufacturing steps.

SUMMARY OF THE INVENTION

The present invention provides a method for manufacturing a perpendicular magnetic write head having a notched trailing shield that minimizes stray fields formation while improving field gradient. The write head having a notched trailing shield is extremely manufacturable, being aligned with the write pole of the perpendicular write head and using presently existing manufacturing methods.

A write head according to an embodiment of the present invention can be constructed by first forming a write pole layer as a full film layer, and then depositing a write gap. A shield pedestal portion can then be formed over the write gap material in a desired pattern. An ion milling operation can then be performed, using the shield pedestal portion as a mask for forming the write head. The ion milling process removes write gap material and write pole material in areas not covered by the shield pedestal portion, resulting in a write pole that is perfectly aligned with the shield pedestal portion.

A further portion of the shield can then be formed and stitched to a return pole. This further portion of the shield thickness in the throat height direction (ie. perpendicular to the ABS) that is much smaller than that of the initially formed first shield pedestal piece. This further shield portion can then be used as a mask to define a throat height thickness of the shield pedestal, the throat height of the shield pedestal being much smaller than the throat height of the write head.

BRIEF DESCRIPTION OF THE DRAWINGS

For a fuller understanding of the nature and advantages of this invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out this invention. This description is made for the purpose of illustrating the general principles of this invention and is not meant to limit the inventive concepts claimed herein.

Figure 1:
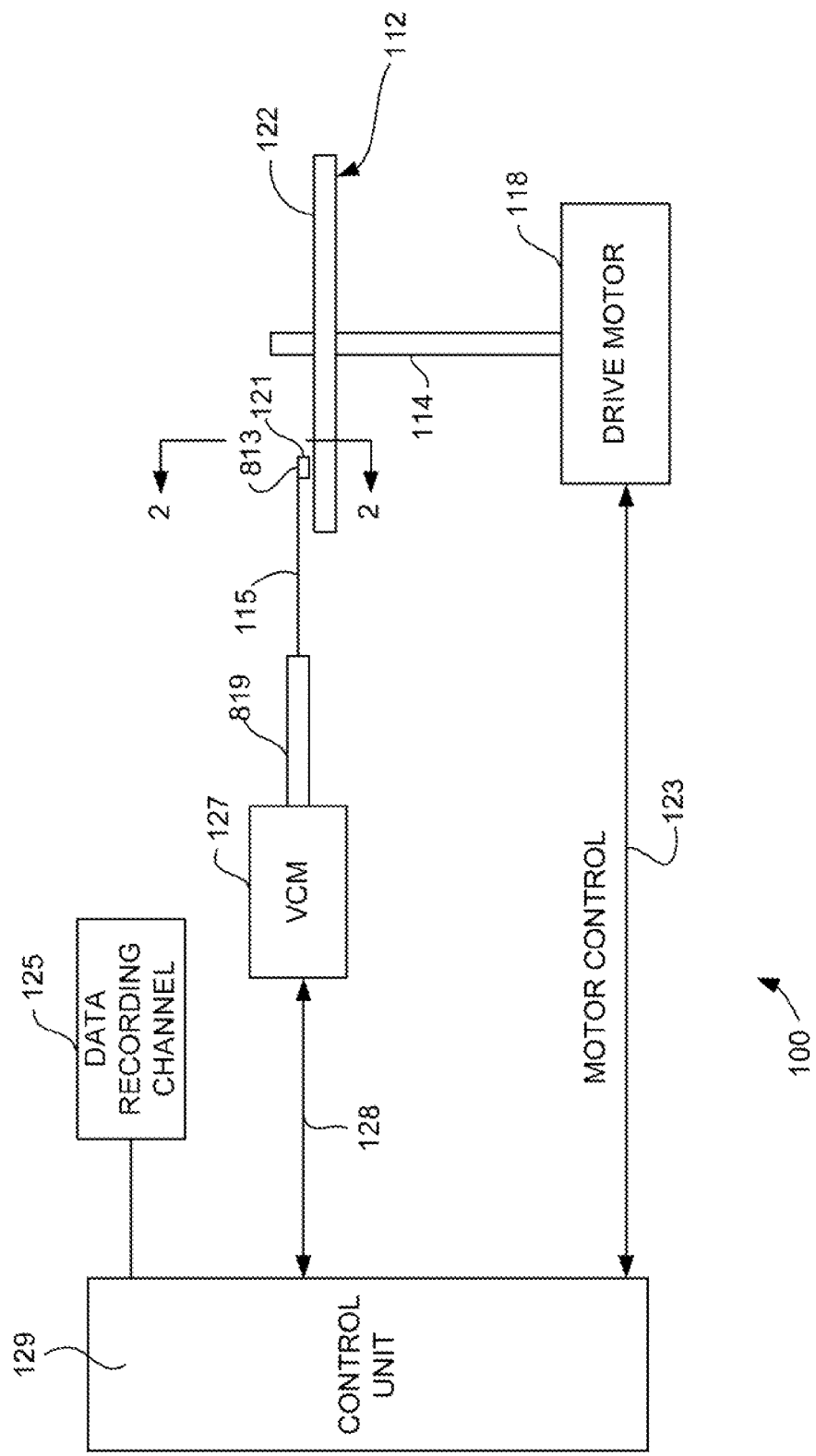
FIG. 1 is a schematic illustration of a magnetic data storage system.

Referring now to FIG. 1, there is shown a disk drive 100 embodying this invention. As shown in FIG. 1, at least one rotatable magnetic disk 112 is supported on a spindle 114 and rotated by a disk drive motor 118. The magnetic recording on each disk is in the form of an annular pattern of concentric data tracks (not shown) on the magnetic disk 112.

At least one slider 113 is positioned near the magnetic disk 112, each slider 113 supporting one or more magnetic head assemblies 121. As the magnetic disk rotates, the slider 113 is moved radially in and out over the disk surface 122 so that the magnetic head assembly 121 may access different tracks of the magnetic disk where desired data are written. Each slider 113 is attached to an actuator arm 119 by way of a suspension 115. The suspension 115 provides a slight spring force which biases slider 113 against the disk surface 122. Each actuator arm 119 is attached to an actuator means 127. The actuator means 127 as shown in FIG. 1 may be a voice coil motor (VCM). The VCM comprises a coil movable within a fixed magnetic field, the direction and speed of the coil movements being controlled by the motor current signals supplied by controller 129.

During operation of the disk storage system, the rotation of the magnetic disk 112 generates an air bearing between the slider 113 and the disk surface 122 which exerts an upward force or lift on the slider. The air bearing thus counter-balances the slight spring force of suspension 115 and supports the slider 113 off and slightly above the disk surface by a small, substantially constant spacing during normal operation.

The various components of the disk storage system are controlled in operation by control signals generated by control unit 129, such as access control signals and internal clock signals. Typically, the control unit 129 comprises logic control circuits, storage means and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Write and read signals are communicated to and from write and read heads 121 by way of recording channel 125.

The above description of a typical magnetic disk storage system, and the accompanying illustration of FIG. 1 are for representation purposes only. It should be apparent that disk storage systems may contain a large number of disks and actuators, and each actuator may support a number of sliders.

Figure 2:
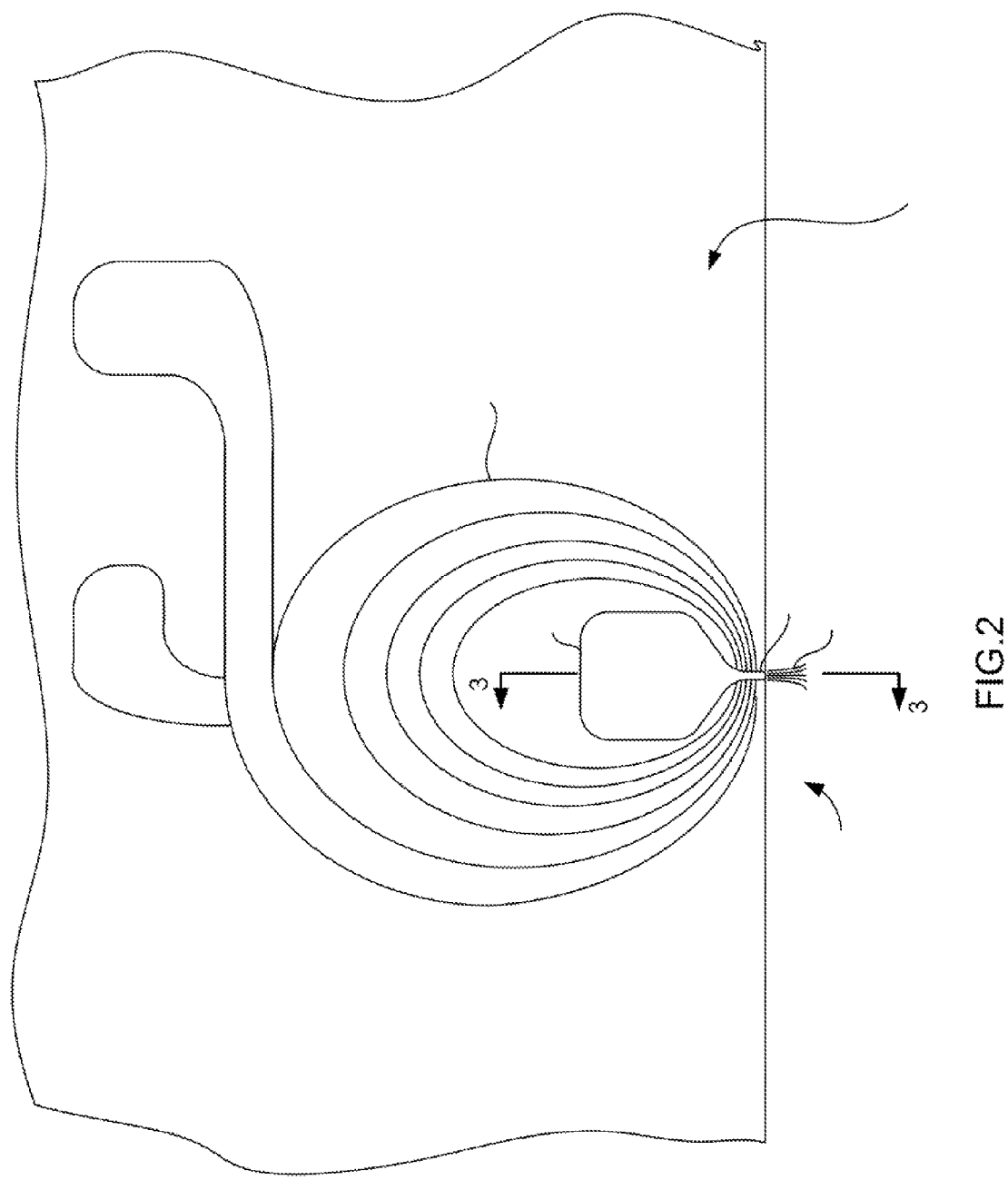
FIG. 2 is a view taken from line 2-2 of FIG. 1, showing a plan view of a write head.

With reference now to FIG. 2, a plan view of an exemplary write element 202, can be seen in relation to a slider 113. A coil 204, passing through a magnetic yoke 206, induces a magnetic flux in the yoke 206. The magnetic flux in the yoke 206, in turn causes a magnetic field to fringe out at the pole tip 208. It is this fringing field 210 that writes magnetic signals onto a nearby magnetic medium.

Figure 3:
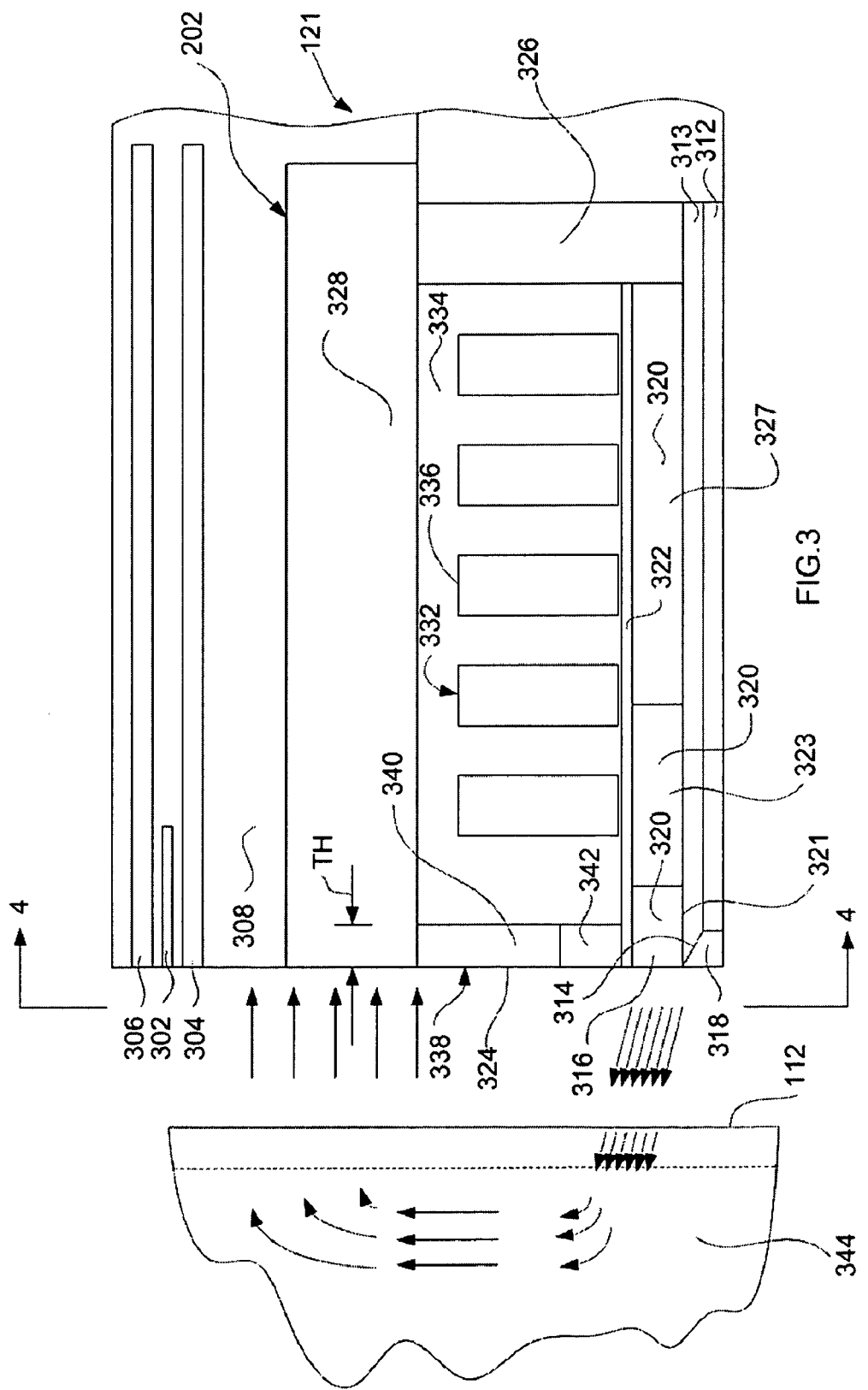
FIG. 3 is a view taken from line 3-3 of FIG. 3 showing a cross section of a magnetic head.
Figure 4:
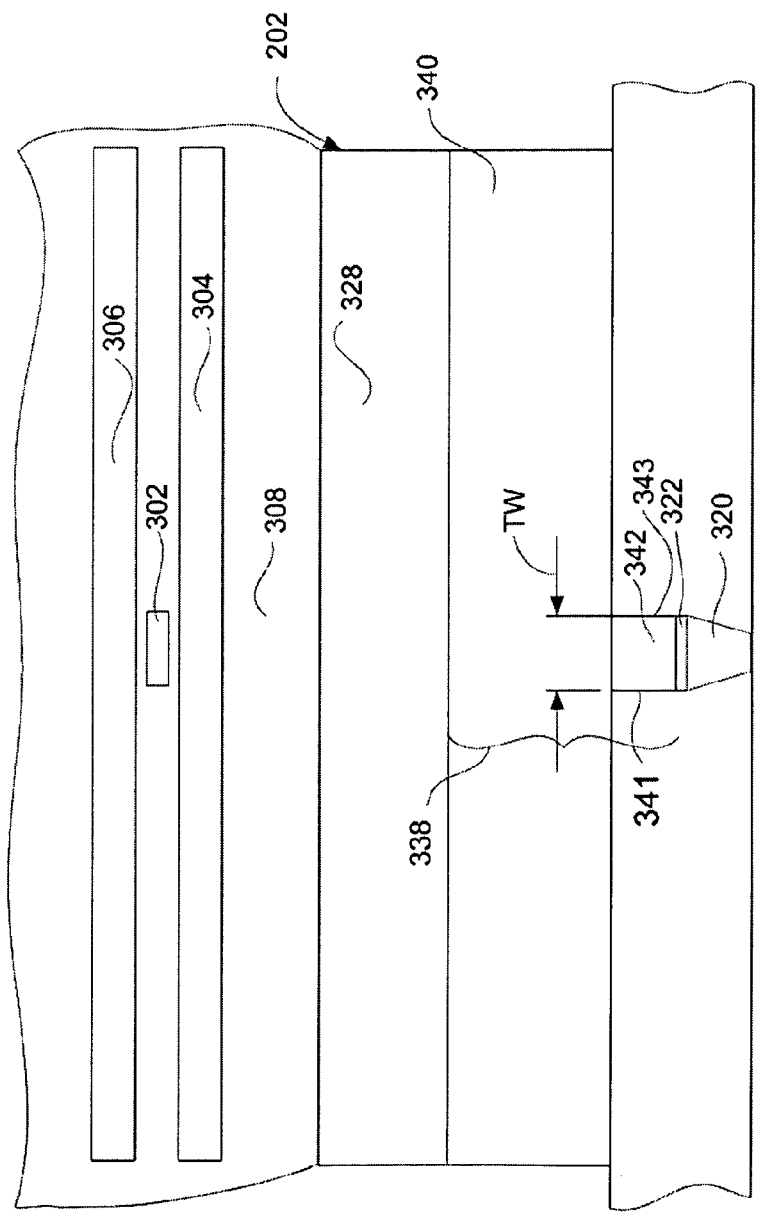
FIG. 4 is an ABS view taken from line 4-4 of FIG. 3.

FIGS. 3 and 4 illustrate a cross section of the magnetic head assembly 121, including a read element 302 sandwiched between first and second shields 304, 306 and a write element 202. The write element 202 is separated from the read element 302 by a dielectric layer 308. The head assembly has an air bearing surface ABS 324 which is the surface that is held in proximity to the surface of the disk 112 during operation.

The write element 202 includes a shaping layer 312 constructed of a magnetic material such as NiFe, which can be deposited by electroplating. The shaping layer 312 can be formed to stop short of the ABS surface 324. A write pole sub-layer 313 is formed on top of the shaping layer 312, and is formed with a taper 314 at a pole tip region 316 which is near the ABS surface. A non-magnetic material such as Alumina $Al_2O_3$ 318 can be used to fill the pole tip region 316 adjacent to the taper 314.

A write pole 320 is magnetically connected with the write pole sub-layer 313. The write pole 320 is preferably formed of laminated layers of a high magnetic saturation material (high Bsat) such as CoFe, NiFe or their alloys with interspersed non-magnetic film such as Ct, Ru, etc. With reference to FIG. 4, the write pole is formed with a trapezoidal shape. As those skilled in the art will appreciate, the trapezoidal shape of the write pole 320 prevents adjacent track writing when the head 121 experiences skew on while flying over the disk 112 (FIG. 1). A write gap material layer 322, is formed over the write pole 320, from the ABS surface 324 to a back gap 326. The write gap material is a non magnetic material which can be either a dielectric material such as alumina or a conductive material such a metal. The back up is formed of a magnetic material such as NiFe and extends from the write pole sub-layer 313 to a return pole 328. The write pole 320, comprises a pole tip region 321, a flare region 323 and a yoke region 327.

An electrically conductive coil 332 passes between the write gap layer 322 and return pole 328 and is electrically insulated by an insulation layer 334, which can be for example alumina or hard baked photoresist. The coil 332 may or may not be insulated from the write gap layer 322, depending upon design requirements and the material that makes up the write gap layer 322.

With continued reference to FIGS. 3 and 4, a magnetic trailing shield 338 extends from the return pole 328 toward the write pole 320. The magnetic shield 338 is constructed with a main shield portion 340 and a notched shield pedestal 342. The main shield portion 340 is magnetically connected with the return pole 328, and is relatively wide as can be seen with reference to FIG. 4. The notched shield portion 342 is much narrower than the main shield portion 340, having the same width as pole tip portion 321 of the write pole 320, and is laterally aligned with the write pole 314 as can be seen with reference to FIG. 4. The distance between the laterally opposed sides 341, 343 of the notched shield portion 342 defines a track width TW of the notched shield portion 342 and write pole 320. As can be seen with reference to FIG. 3, the main shield portion 340 and notched shield pedestal portion have the same depth in a direction perpendicular to the ABS, which defines a common throat height TH for the notched shield portion 340 and main shield portion 342 and are in fact self aligned, as will be explained in greater detail below.

In another embodiment of the present invention, the trailing shield 338 could be constructed as one or more pieces having the same width as the write pole 320, and having that width completely to the return pole 328.

As electrical current flows through the coil 322, a magnetic flux is induced through a yoke formed of the return pole 328, back gap 326, write pole sublayer 313, shaping layer 312 and write pole 320. Due to the arrangement of the write pole 320, write pole sublayer 313 and shaping layer 312, the magnetic flux is advantageously strongly concentrated at the tip of the write pole 320, and causes a concentrated magnetic field to emit from the write pole 320 toward the disk 112. The presence of the shield 338 causes the emitted, concentrated field to be canted a desired amount.

Optimally, the distance from the write pole 320 to the shield notched portion 342 of the shield 338 should be about half of the distance from the ABS to the soft under layer 344 of the disk 112. It should be appreciated that the Figures presented herein are not to scale, and for purposes of clarity some elements may be shown larger relative to other elements than they would actually be, or appear further away from or closer to other elements than they would actually be.

As the write gap thickness is reduced, flux from the write pole is shared between the soft underlayer 344 of the media 112 and the shield 338. This design improves write field gradient at the expense of write flux. To minimize write flux lost to the shield and still achieve the angling effect of the effective field, as a rule of thumb, the shield thickness as measured from the ABS 324 should be less than the track width of the write element, (ie. less than the width of the write pole 320 as viewed from the ABS) and is more preferably approximately equal to half the trackwidth. As the write pole 320 is scaled toward tighter dimension and constrained by the design for skew, the amount of write field coming out at the write pole tip is attenuated and insufficient to drive the head. One approach to alleviate this is to drive the head with higher write current, but this would lead to adjacent track interference and protrusion due to heat generation. Notching the trailing shield 338 as described above alleviates this cross track interference. Experiments have shown that an 8-10 percent increase in effective write field can be achieved if a portion of the trailing shield 338 is notched and aligned to the write pole 320. The challenge in fabricating such an aligned, notched trailing shield in a write element having a trailing shield single pole design is the ability to tightly control the gap 322 between the write pole and the shield 338 and self-aligning the notched shield portion 342 to the write pole since the critical dimensions of the write pole trackwidth are in the nanometer scale. For example, in an 88 nanometer trackwidth write pole, the width of the notched portion 342 of the trailing shield would have to be 88 nanometers.

Figure 5:
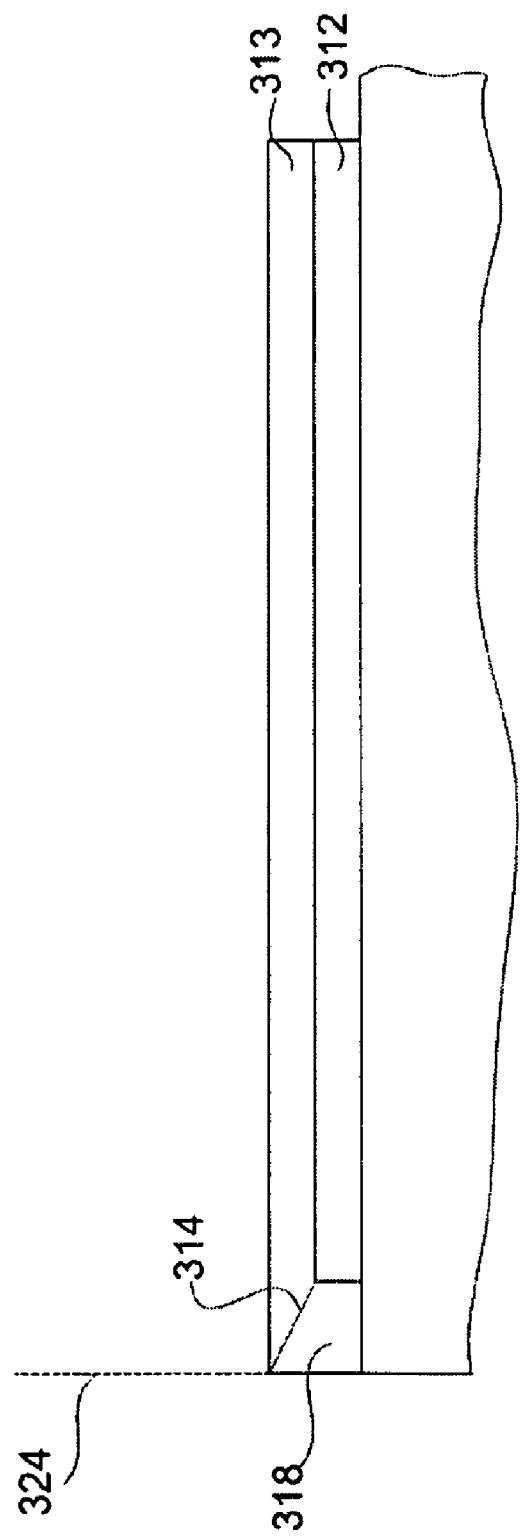
FIGS. 5-11 are cross sectional views depicting a magnetic head in various stages of manufacture.
Figure 6:
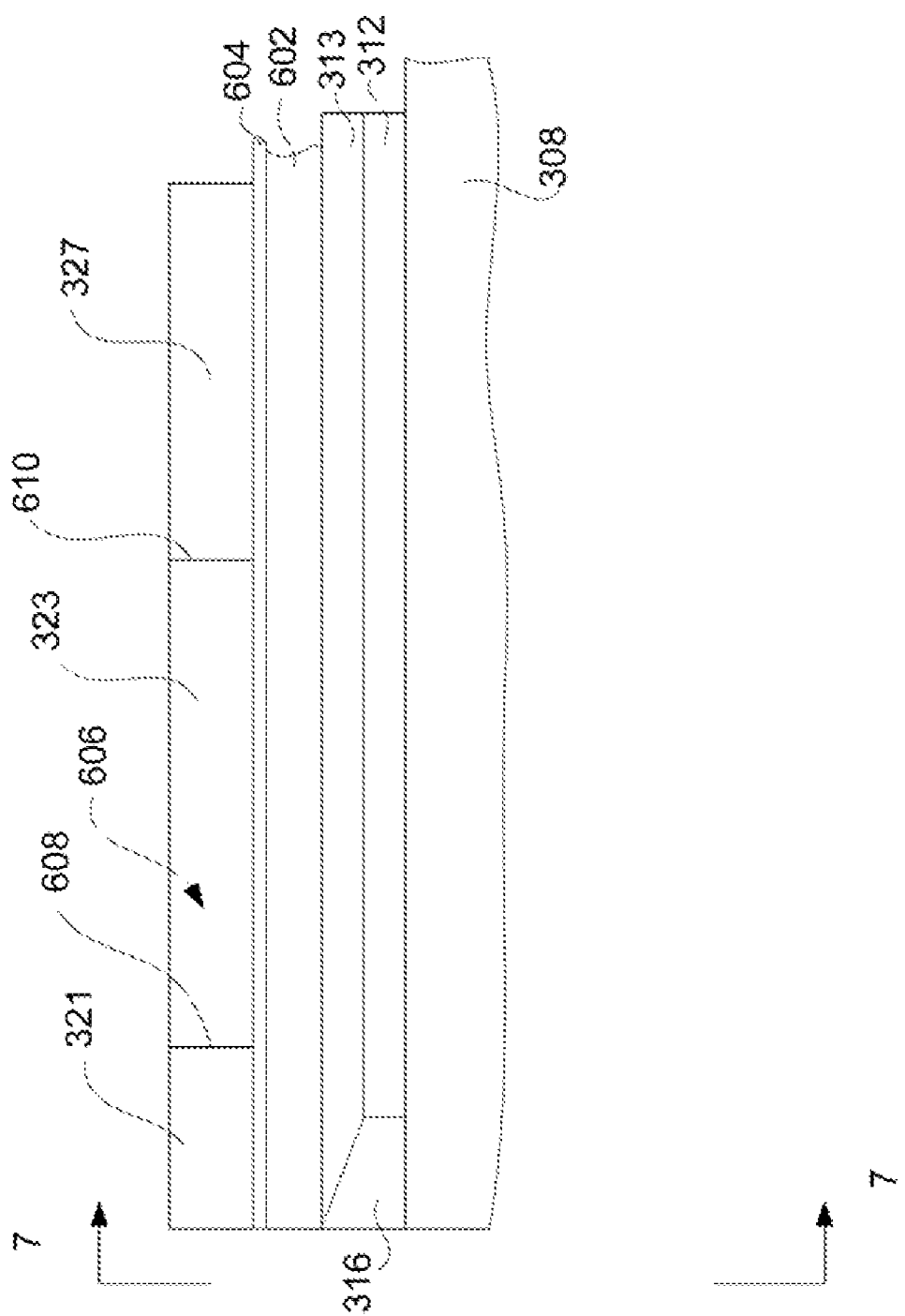
Figure 7:
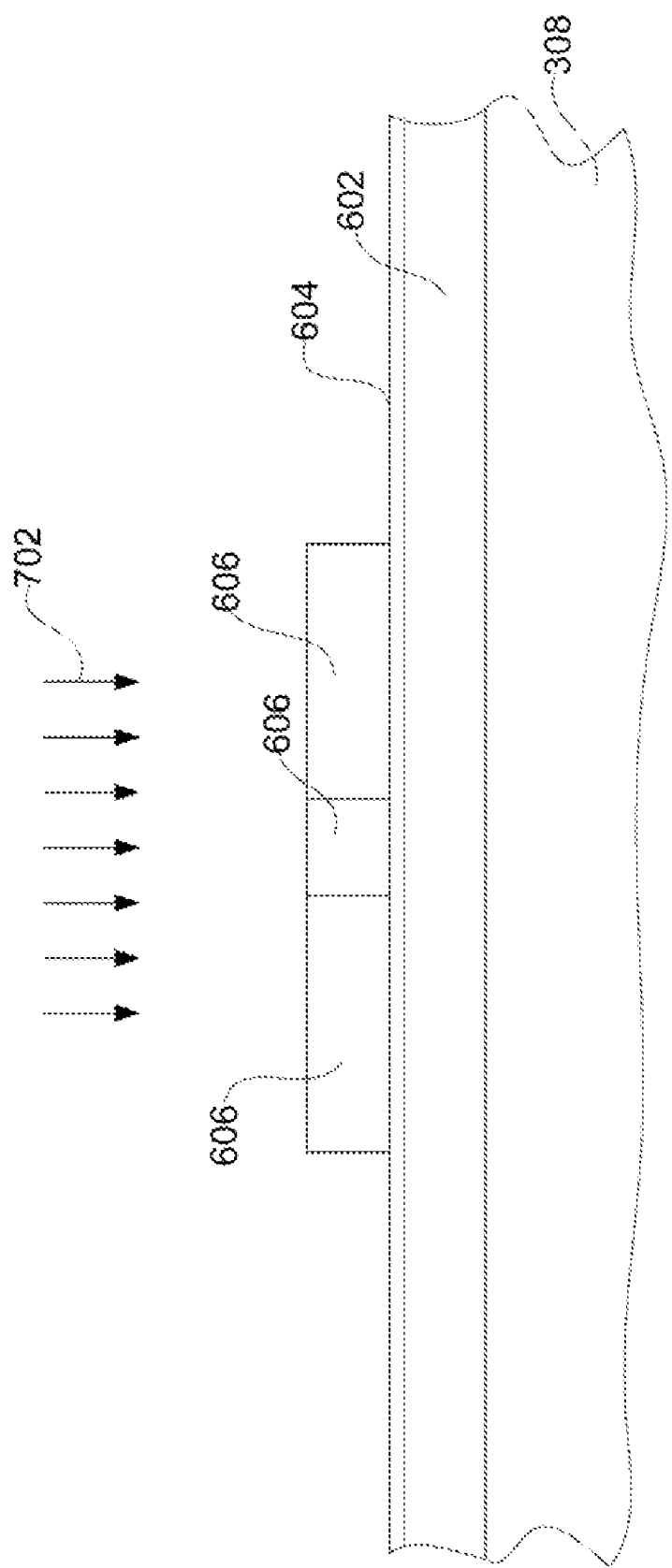

FIGS. 5-7 illustrate a method of fabricating a perpendicular write head having a self aligned notched trailing shield. The shaping layer 312, constructed of a magnetic material such as NiFe is formed over a substrate 501, such as alumina, and can be deposited for example by sputtering and electroplating. As can be seen with reference to FIG. 5, the shaping layer is constructed so as to be recessed from the ABS plane 324. The write pole sublayer 313 is then constructed over the shaping layer 312, and is formed with the taper 314. A non-magnetic material such as alumina 316 fills the area adjacent to the shaping layer 312 and taper 314 in the pole tip region 316, near the ABS 324.

Figure 8:
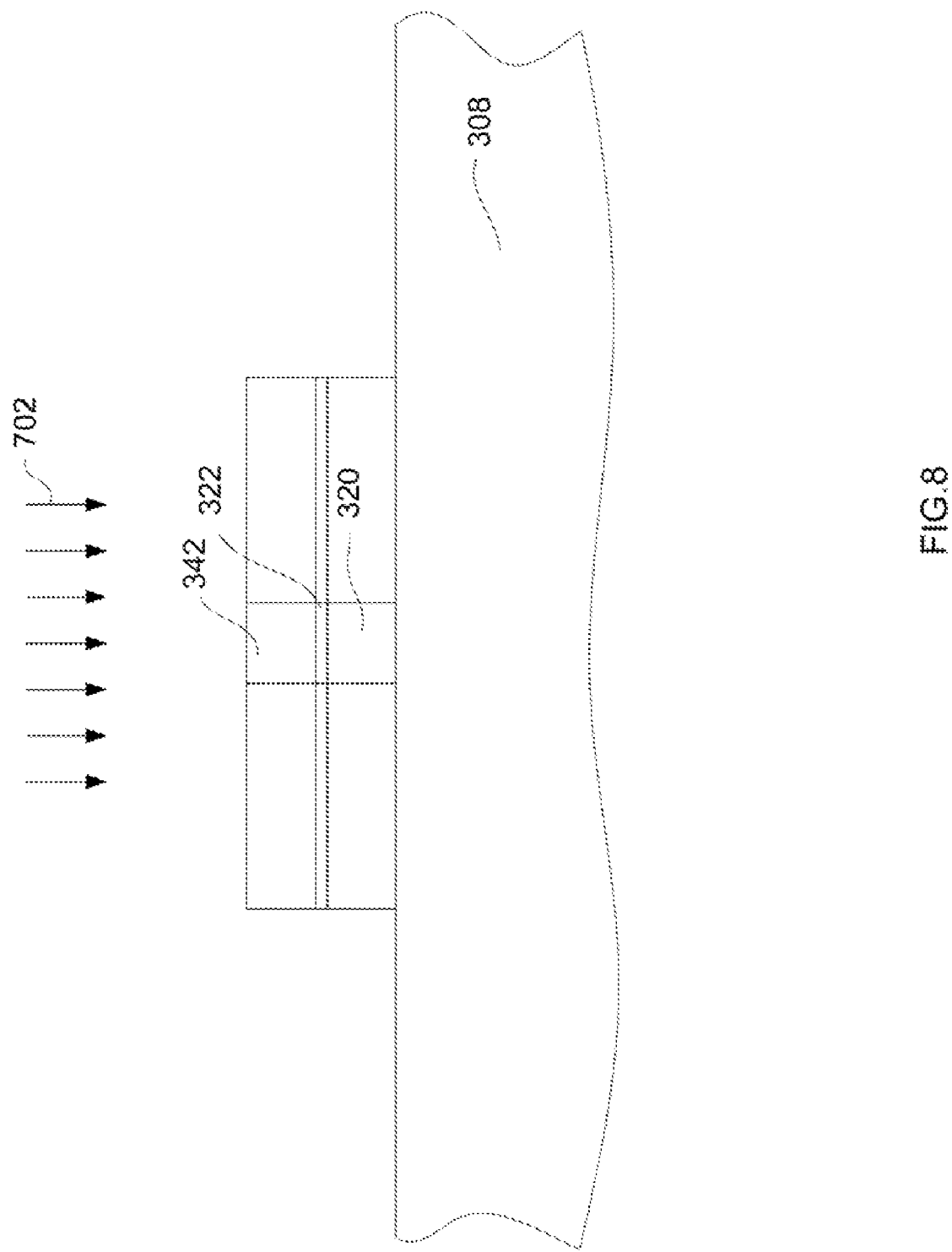
Figure 9:
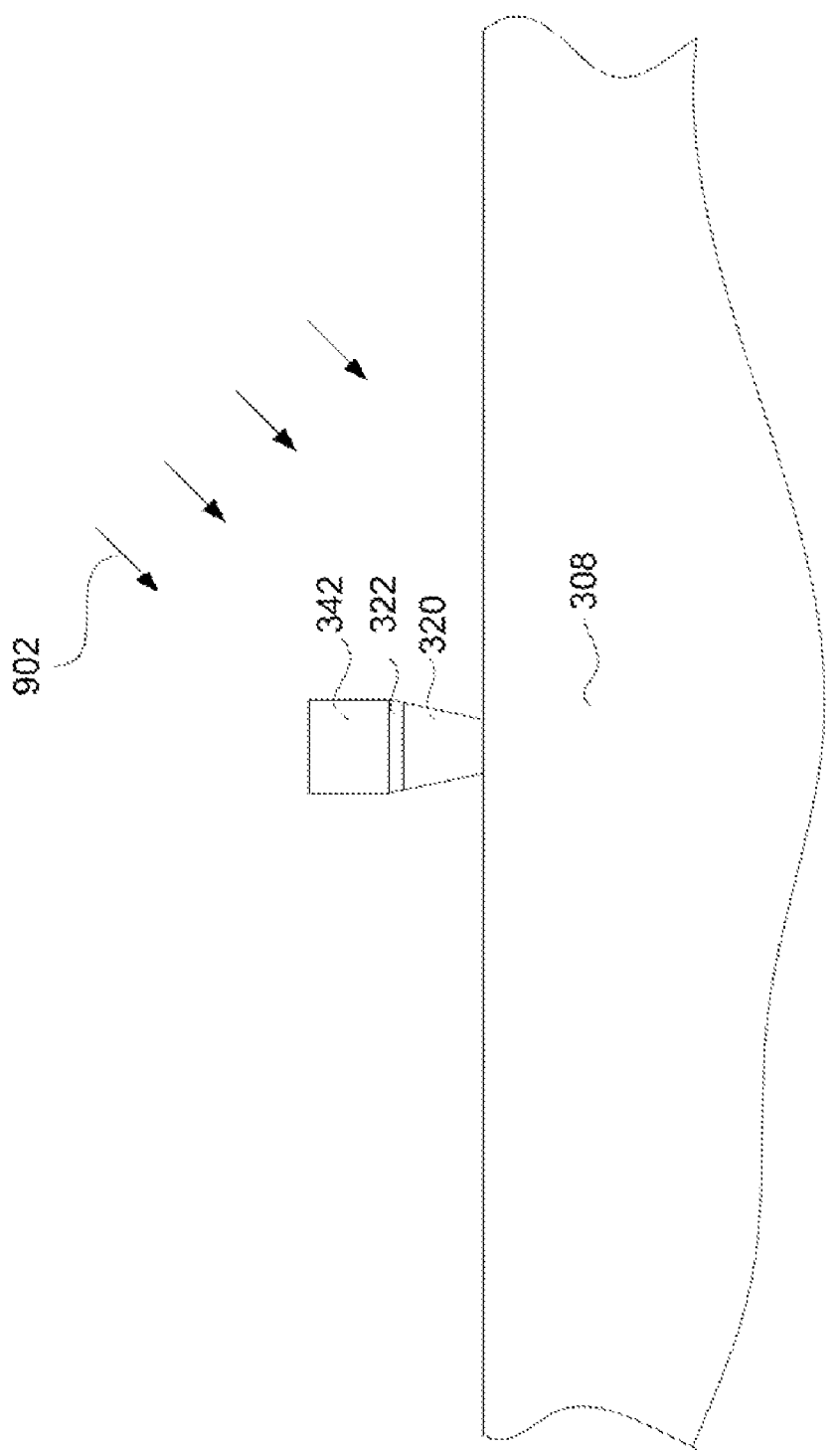

With reference now to FIGS. 6 and 7 a full film of high magnetic saturation (high Bsat) material 602 is deposited. The high magnetic saturation material is preferably a laminated material. Laminated materials have been found to have improved lower magnetic switching fields when compared with single layer, solid films. A thin layer of write gap material 604 is then deposited on top of the high Bsat material. Thereafter, a magnetic shield pedestal 606 is formed over the write gap material. The shield pedestal 606 is constructed of a magnetic material such as NiFe and can be formed by lithographic patterning and plating, using techniques familiar to those skilled in the art, and at this point in the manufacturing process extends back to the back gap and has the same shape as the desired final shape of the write pole 320. The lines 608, 610 denote the transitions between pole the pole tip region 321, flare region 323, and yoke region 327, and are not meant to imply a discontinuity in the pedestal material. With reference now to FIG. 7 an ion mill 702 is performed, which removes portions of the write gap material layer 604 and magnetic layer 602 that are not covered by the shield pedestal, resulting a structure illustrated with reference to FIG. 8. With reference to FIG. 9, angled and sweep milling operations 902 can be performed to form the desired trapezoidal shape of the write pole 314.

Figure 10:
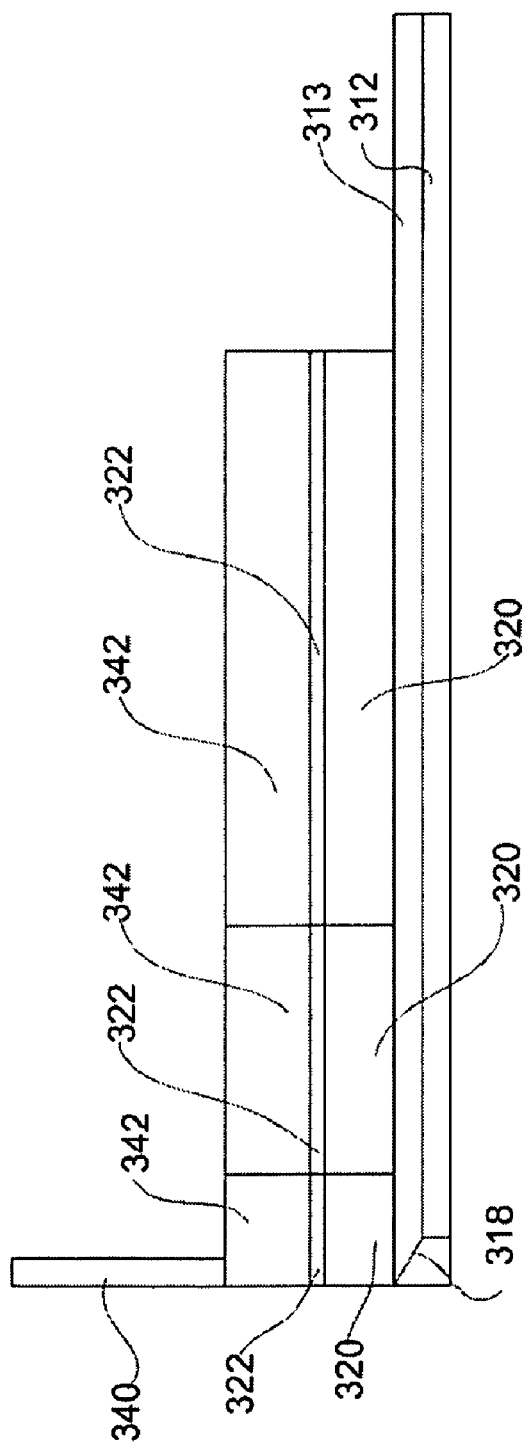
Figure 11:
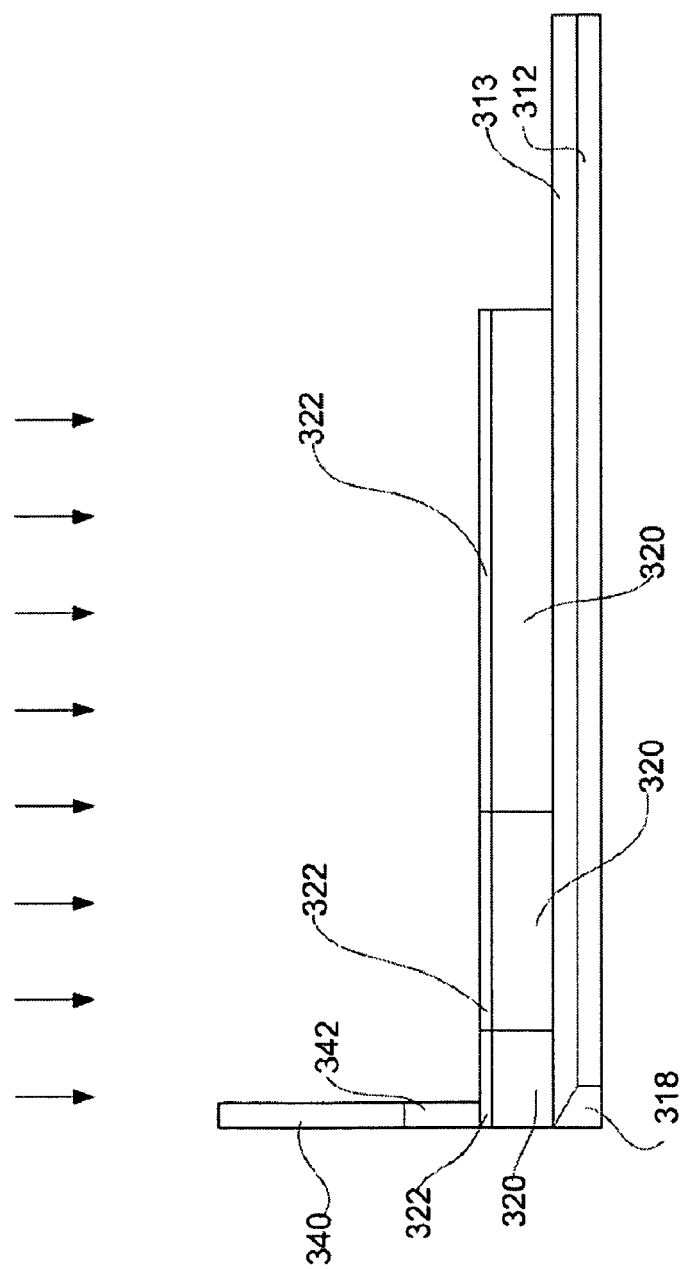

With reference to FIG. 10, a the main shield portion 340 (formed further from the write pole) is formed above the shield pedestal 320, having a lateral width parallel with the ABS surface that is much wider than the pedestal 320, and having a short throat height dimension (perpendicular to the ABS surface). With reference to FIG. 11, an ion milling process is then performed, using the main shield 340 portion as a mask to define the throat height of the shield pedestal 320, thereby self aligning the shield pedestal with the main shield portion in the throat height direction. The detection of write gap material in the ion mill atmosphere indicates that ion milling should be terminated.

It will be appreciated that the method described above forms a perfectly aligned notched shield by using the notched pedestal portion 342 of the shield 338 (FIG. 3) as a mask for forming the write pole 320, and using the main shield portion 340 as a mask for the pedestal 320. Since the shield pedestal 342 protects the write gap 342 during subsequent ion milling operations, the critical gap thickness can be accurately controlled and maintained.

With reference again to FIGS. 3 and 4, with the shield pedestal 342 formed, the remaining elements can be constructed. The insulator 330 is deposited, which can optionally be followed by a chemical mechanical polishing process. Insulation 336 can be deposited and the back gap 326 formed according to methods familiar to those skilled in the art. In addition, the main portion 340 of the shield 338 can be constructed. As mentioned above, constructing the shield 338 as two separate layers is only one possible embodiment. The shield, 338 could also be constructed by extending the shield pedestal 342 completely to the return pole 328, so that the pedestal 342 constitutes the shield 338. The return pole 328 can be constructed by electroplating.

In an optional method for further defining the dimensions of the shield pedestal 342, the main portion 340 of the shield 338 can be used as a mask to define the throat height of the pedestal 342. The throat height is the length of the pedestal in the dimension perpendicular to the ABS 324.

While various embodiments have been described above, it should be understood that they have been presented by way of example only, and not limitation. Other embodiment will no doubt occur to those skilled in the art. For example, the read element could either be formed above or below the write element and if formed below the write element, a heat sink layer, such as Cu could be included to conduct heat away from the write head to protect the read element. Thus, the breadth and scope of a preferred embodiment should not be limited to any of the above-described exemplary embodiments, but should be defined only in accordance with the following claims and their equivalents.

What is claimed is:

1. A method for constructing a write head for perpendicular magnetic recording, comprising:
   depositing a layer of write pole material;
   depositing a non-magnetic write gap material over said write pole material;

forming a magnetic shield pedestal over said write gap material layer, said shield pedestal having first and second lateral sides defining planes perpendicular to an air bearing surface; and performing a material removal process to remove selected portions of said write gap layer and said write pole material using said shield pedestal as a mask to prevent removal of said write gap material and said write pole material disposed beneath said shield pedestal;

wherein a distance between said first and second lateral sides of said shield pedestal defines a track width and wherein said shield pedestal has a depth in a direction perpendicular to said air bearing surface that is less than said track width.

2. A method as in claim 1 wherein said material removal process comprises ion milling.

3. A method as in claim 1 wherein said material removal process comprises ion milling at an angle between 0 and 90 degrees with respect to at least one of said lateral side walls of said shield pedestal.

4. A method for constructing a write head for perpendicular magnetic recording, comprising:

depositing a layer of write pole material;

depositing a non-magnetic write gap material over said write pole material;

forming a magnetic shield pedestal over said write gap material layer, said shield pedestal having first and second lateral sides defining planes perpendicular to an air bearing surface; and performing a material removal process to remove selected portions of said write gap layer and said write pole material using said shield pedestal as a mask to prevent removal of said write gap material and said write pole material disposed beneath said shield pedestal;

wherein said shield pedestal is constructed of a laminated magnetic layers.

5. A method for constructing a write head for perpendicular magnetic recording, comprising:

depositing a layer of write pole material;

depositing a non-magnetic write gap material over said write pole material;

forming a magnetic shield pedestal over said write gap material layer, said shield pedestal having first and second lateral sides defining planes perpendicular to an air bearing surface;

performing a material removal process to remove selected portions of said write gap layer and said write pole material using said shield pedestal as a mask to prevent removal of said write gap material and said write pole material disposed beneath said shield pedestal; and depositing a magnetic main shield portion over said shield pedestal; and performing a second material removal process, using said magnetic main shield material as a mask to remove selected portions of said shield pedestal to define a throat height of said shield pedestal, said throat height being a dimension measured from said air bearing surface.

6. A method as in claim 5, wherein said second material removal process comprises ion milling.

* * * * *